(12) United States Patent
Mishina et al.

(10) Patent No.: US 6,761,328 B2
(45) Date of Patent: Jul. 13, 2004

(54) SEAT BELT RETRACTOR

(75) Inventors: Joji Mishina, Tokyo (JP); Yasushi Kanamori, Tokyo (JP); Masahiro Shiotani, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/729,095

(22) Filed: Dec. 5, 2000

(65) Prior Publication Data

US 2001/0006203 A1 Jul. 5, 2001

(30) Foreign Application Priority Data

Dec. 8, 1999 (JP) .............................. 11-348622
Nov. 30, 2000 (JP) ....................... 2000-365599

(51) Int. Cl.[7] .............................................. B65H 75/48
(52) U.S. Cl. ................................................. 242/379.1
(58) Field of Search ..................... 242/379.1; 280/805, 280/806; 297/470–472, 478

(56) References Cited

U.S. PATENT DOCUMENTS

| | | | |
|---|---|---|---|
| 3,970,265 A | | 7/1976 | Köpke et al. |
| 4,322,046 A | * | 3/1982 | Tanaka et al. ............ 242/379.1 |
| 5,779,176 A | | 7/1998 | Hori et al. |
| 5,887,814 A | * | 3/1999 | Matsuki et al. .......... 242/379.1 |
| 5,954,287 A | | 9/1999 | Hirase |
| 5,967,441 A | * | 10/1999 | Kohlndorfer et al. .... 242/379.1 |
| 5,984,223 A | * | 11/1999 | Hiramatsu ............... 242/379.1 |
| 6,029,924 A | * | 2/2000 | Ono et al. ............... 242/379.1 |
| 6,131,843 A | | 10/2000 | Singer et al. |
| 6,216,972 B1 | | 4/2001 | Röhrle |
| 6,241,172 B1 | * | 6/2001 | Fugel et al. ............. 242/379.1 |
| 6,299,091 B1 | | 10/2001 | Blackadder et al. |
| 6,336,606 B1 | | 1/2002 | Smithson et al. |
| 2001/0023904 A1 | * | 9/2001 | Kanamori et al. ....... 242/379.1 |

FOREIGN PATENT DOCUMENTS

| | | | |
|---|---|---|---|
| DE | 2419937 | | 7/1976 |
| GB | 2 326 851 A | * | 6/1999 |
| JP | 10-053101 A | * | 2/1998 |
| JP | 11-105671 A | * | 4/1999 |
| JP | 2000-289572 | | 10/2000 |
| JP | 2001-151077 | * | 6/2001 |

* cited by examiner

Primary Examiner—Donald P. Walsh
Assistant Examiner—Joseph C Rodriguez
(74) Attorney, Agent, or Firm—Foley & Lardner LLP

(57) ABSTRACT

A seat belt retractor including a torsion bar is provided. A second torque transmitting portion of the torsion bar is clamped between a reel and a holder member press-fitted radially in the reel without backlash in the axial direction. A first torque transmitting portion is strictly fixed to a pawl holder without backlash in the axial direction by radially crimping an internal periphery of a left end portion of the pawl holder of a locking means. Therefore, the first and second torque transmitting portions conventionally formed in a torsion bar are effectively used, thereby eliminating a groove for an E-ring as conventionally used and thus simplifying the configuration of the torsion bar. In addition, since the first and second torque transmitting portions can operate without backlash, the occurrence of jarring noise due to vibrations of the seat belt retractor can be prevented.

10 Claims, 7 Drawing Sheets

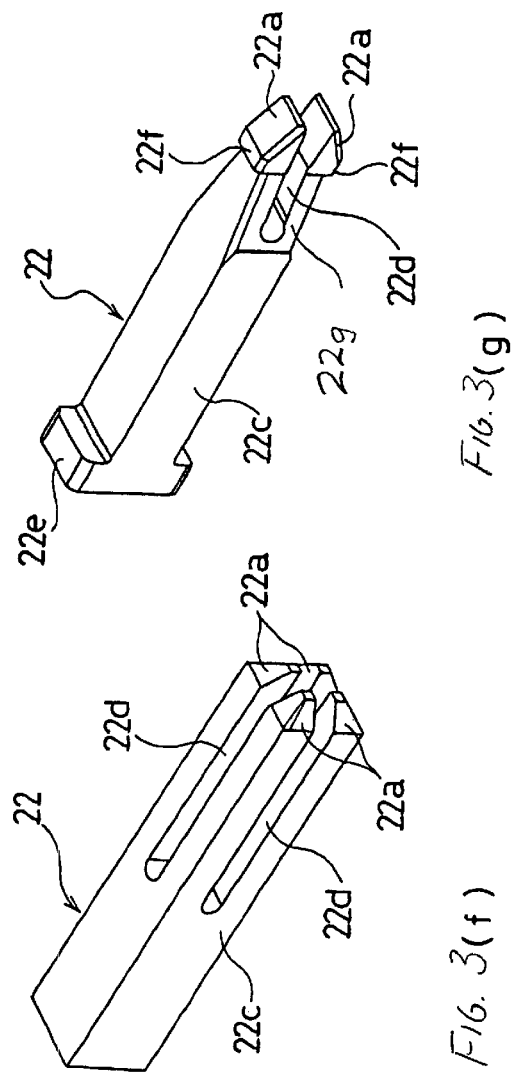
FIG. 3(g)
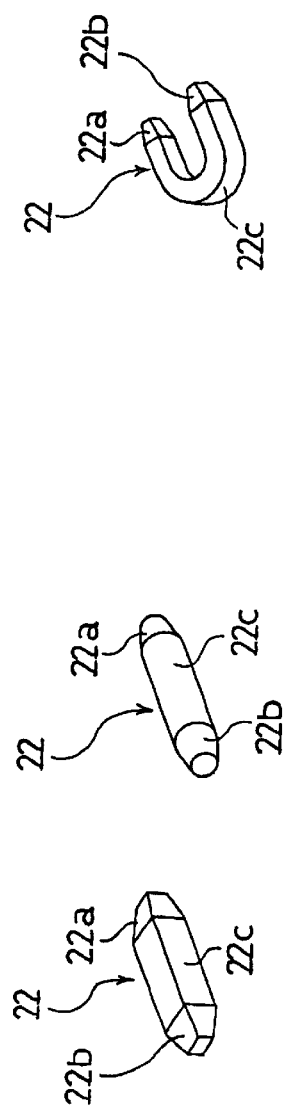
FIG. 3(c)
FIG. 3(f)
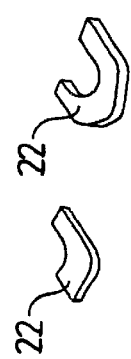
FIG. 3(a)  FIG. 3(b)  FIG. 3(d)  FIG. 3(e)

SEAT BELT RETRACTOR

BACKGROUND OF THE INVENTION

The present invention relates to a seat belt retractor for a webbing that permits the webbing to be retracted and withdrawn. More particularly, the present invention relates to a seat belt retractor with a torsion bar for absorbing load exerted on a webbing when an occupant puts on the webbing and the webbing is stopped from being withdrawn in the event of emergency such as a vehicle collision at which large deceleration is exerted on the vehicle.

Conventionally, a seat belt device installed in a vehicle such as an automobile prevents an occupant from being thrown out of a vehicle seat by restraining the occupant with a webbing. The seat belt protects the occupant in the event of emergency such as mentioned above.

A typical seat belt device is provided with a seat belt retractor for accommodating a webbing. When not used, the webbing is fully wound on a reel of the retractor. When an occupant puts on the webbing, the seat belt is withdrawn to extend across the occupant. The seat belt retractor includes a locking mechanism that is activated in the event of emergency as mentioned above to stop the rotation of the reel in an unwinding direction, thereby preventing the webbing from being withdrawn. Therefore, the seat belt webbing can securely restrain and protect the occupant.

However, conventional seat belt retractors being used in seat belt devices have a drawback or problem. That is, when the webbing restrains and protects the occupant, a large deceleration is exerted on the vehicle so that the occupant tends to move forward due to a large inertia force. Accordingly, a large load is exerted on the webbing and the occupant receives a large impact load from the webbing. Thus, there remains a need to absorb the impact load to reduce the discomfort for the occupant. Though this impact load is not so severe for the occupant, it is better to absorb the impact load.

FIG. 8 is a vertical sectional view showing an example of a conventional seat belt retractor 1 including a torsion bar. As shown in the drawing, the seat belt retractor, includes a U-like frame 2, a webbing 3, a reel 4 which is rotatably supported between side walls of the U-like frame 2 and on which the webbing 3 is wound, a deceleration sensing means 5 which detects a large deceleration of the vehicle occurred in case of emergency mentioned above, a locking mechanism 6 which is activated by the deceleration sensing means 5 to prevent the reel from rotating in the webbing unwinding direction, a torsion bar 7 loosely fitted and inserted in the axial direction in the center of the reel 4 and which rotatably connects the reel 4 and the locking mechanism 6, a spring means 8 for always biasing the reel 4 in the webbing winding direction through a bush 10 by the spring force of a spiral spring 9, a pretensioner 11 which is activated in the case of emergency mentioned above for producing webbing winding torque, and a bush 12 for transmitting the webbing winding torque of the pretensioner 11 to the reel 4.

The locking mechanism 6 include a pawl holder 14 which rotates together with a first torque transmitting portion 17 of the torsion bar 7. The holder 14 pivotally holds the pawl 13 and also includes a lock gear 6a which rotates together with the torsion bar 7 during normal operation. The lock gear 6a stops in an emergency corresponding to the activation of the deceleration sensing means 5 to produce rotation relative to the torsion bar 7 and engages the pawl 13 with one of internal teeth 19 of the side wall of the frame 2, thereby stopping the rotation of the pawl holder 14 and the rotation of the reel 4 in the webbing unwinding direction. The pawl holder 14 has an external thread portion 15 that includes a nut-like stopper member 16 which rotates together with the reel 4 and is screwed into the thread portion 15.

The torsion bar 7 includes the first torque transmitting portion 17 which is fitted to the pawl holder 14 not allowing relative rotation therebetween, and a second torque transmitting portion 18 which is fitted to the reel 4 not allowing relative rotation therebetween.

The reel 4 is always biased by the spring force of the spring means 8 in the webbing winding direction through the bush 10, the torsion bar 7, the second torque transmitting portion 18 of the torsion bar 7, and the bush 12. The webbing winding torque produced by the pretensioner 11 is transmitted to the reel 4 through the bush 12 whereby the reel 4 winds up the webbing 3 a predetermined amount.

In the conventional seat belt retractor 1 having the aforementioned structure, the webbing 3 is fully wound up by the biasing force of the spring means 8 when not being used by a vehicle passenger. As the webbing 3 is withdrawn at a normal speed for putting on, the reel 4 rotates in the webbing unwinding direction so that the webbing 3 is smoothly withdrawn. After a tongue (not shown) slidably fitted to the webbing 3 is inserted into and engaged with a buckle fixed to a vehicle body, the excess amount of the webbing 3 is wound back onto the reel 4 by the biasing force of the spring means 8 until the webbing 3 is fitted to the occupant's body without excess stress.

In an emergency, such as mentioned above, the webbing winding torque produced by the pretensioner 11 is transmitted to the reel 4 so that the reel 4 winds up the webbing 3 for a predetermined amount, in order to strongly restrain the occupant. The deceleration sensing means 5 is activated by a large deceleration produced by the emergency condition to activate the locking mechanism 6. The activation of the deceleration sensing means 5 prevents the rotation of the lock gear 6a in the webbing unwinding direction. In addition, the pawl 13 of the locking mechanism 6 pivots and engages one of the internal teeth 19 of the side wall of the frame 2 so as to stop the rotation of the pawl holder 14. As a result of this, the reel 4 rotates in the webbing unwinding direction relative to the pawl holder 14 while the torsion bar 7 is twisted. By this twisting of the torsion bar 7, the load applied to the webbing 3 is limited, thus absorbing the impact on the occupant.

Since the reel 4 rotates relative to the paw holder 14, the stopper member 16 rotates relative to the external thread portion 15 which is screwed into the stopper member 16, whereby the stopper member 16 moves toward the pawl holder 14. When stopper member 16 comes into contact with the pawl holder 14, the stopper member 16 is prevented from further rotation. As a result, the reel 4 is also prevented from rotating and the torsion bar 7 is prevented from being twisted. In this manner, the webbing 3 is stopped from being withdrawn whereby the occupant is restrained by the webbing 3. Thus, the movement of the stopper member 16 defines the maximum allowable twisting deformation of the torsion bar 7. Through adjustment the EA ("Energy Absorbing") stroke as a rotatable stroke of the reel 4 relative to the pawl holder 14 can be freely set.

In addition, in the conventional seat belt retractor 1, the pawl holder 14 of the locking mechanism 6 rotates in the webbing unwinding direction relative to the lock gear 6a when the webbing is rapidly withdrawn. Also in this case, the pawl 13 of the locking mechanism 6 engages one of the internal teeth 19 of the side wall of the frame 2 so as to stop the rotation of the pawl holder 14 in the same manner as mentioned above. Therefore, the reel 4 is prevented from rotating in the unwinding direction through the torsion bar 7, thus stopping the withdrawal of the webbing.

In the conventional seat belt retractor 1, the torsion bar 7 extends to penetrate the bush 12. The bush 12 is sandwiched between the second torque transmitting portion 18 of the torsion bar 7 and an E-ring 20 fitted to a groove of the torsion bar 7 whereby the movement of the torsion bar 7 in the axial direction relative to the bush 12 is limited. The relative movement of the bush 12 in the axial direction relative to the frame 2 is limited. Thus, the movement of the torsion bar 7 relative to the frame 2 is limited. The torsion bar 7 is fixed in the axial direction relative to the frame 2 and the reel 4.

In the conventional seat belt retractor 1, the groove in which the E-ring 20 is fitted is required to be formed in the torsion bar 7. This arrangement complicates the configuration of the torsion bar 7. In addition, since the torsion bar 7 extends to penetrate the bush 12, the torsion bar 7 should have a long axial length.

Furthermore, there can be backlash due to the dimensional tolerance between the E-ring 20 and the groove in which the E-ring 20 is fitted. The backlash may cause a jarring noise when the vehicle vibrates for running. A mechanism must be provided to reduce the jarring noise. Thus, the structure for fixing the torsion bar 7 in the axial direction is complex thereby reducing the workability of assembling the torsion bar 7, and increasing the cost.

Thus, there remains a need for a seat belt retractor which can be manufactured at a low cost and which can realize the simplification of the configuration of a torsion bar, the simplification of the structure for fixing the torsion bar in the axial direction, and the improvement of the workability of assembling the torsion bar, and can prevent the occurrence of a jarring noise.

SUMMARY OF THE INVENTION

To solve the aforementioned problems, an improved seat belt retractor is provided. The seat belt retractor comprises a reel for winding up a webbing; a locking means for preventing the rotation of the reel in the webbing unwinding direction when actuated; a deceleration sensing means which detects a predetermined deceleration to actuate the locking means; and a torsion bar rotationally connecting the reel and the locking mechanism. The torsion bar having a portion disposed within the reel coaxially with the reel, the torsion bar absorbing load exerted on the webbing when the locking means is actuated. The torsion bar comprises a flange-like first torque transmitting portion which is fitted to the locking means so that the first torque transmitting portion is connected to the locking means to rotate together. The torsion bar also includes a second torque transmitting portion which is fitted to the reel so that the second torque transmitting portion is connected to the reel to rotate together. The torsion bar further includes a torsion portion which is fixed between the first and second torque transmitting portions and is designed to be twisted to absorb the load exerted on the webbing. One end in the axial direction of at least one of the first and second torque transmitting portions is axially in contact with the corresponding one of the locking means. The reel and the other end of the at least one of the torque transmitting portions is axially in contact with a holder member fitted in the corresponding one of the locking means and the reel.

According to an alternative embodiment of the present invention, a seat belt retractor is provided. The seat belt retractor comprises a reel for winding up a webbing; a locking means for preventing the rotation of the reel in the webbing unwinding direction when actuated; a deceleration sensing means which detects a predetermined deceleration to actuate the locking means; and a torsion bar rotationally connecting the reel and the locking mechanism. The torsion bar having a portion disposed within the reel coaxially with the reel. The torsion bar absorbing load exerted on the webbing when the locking means is actuated. The torsion bar comprises a flange-like first torque transmitting portion which is fitted to the locking means so that the first torque transmitting portion is connected to the locking means to rotate together. The torsion bar also includes a second torque transmitting portion which is fitted to the reel so that the second torque transmitting portion is connected to the reel to rotate together. The torsion bar further includes a torsion portion which is fixed between the first and second torque transmitting portions and is designed to be twisted to absorb the load exerted on the webbing. One end in the axial direction of at least one of the first and second torque transmitting portions is axially in contact with the corresponding one of the locking means. The reel and the other end of the at least one of the torque transmitting portions is axially in contact with a crimped portion of the corresponding one of the locking means and the reel.

According to another alternative embodiment of the present invention, a seat belt retractor is provided. The seat belt retractor comprises a reel for winding up a webbing; a locking means for preventing the rotation of the reel in the webbing unwinding direction when actuated; a deceleration sensing means which detects a predetermined deceleration to actuate the locking means; and a torsion bar rotationally connecting the reel and the locking mechanism. The torsion bar having a portion disposed within the reel coaxially with the reel. The torsion bar absorbing load exerted on the webbing when the locking means is actuated. The torsion bar comprises a flange-like first torque transmitting portion which is fitted to the locking means so that the first torque transmitting portion is connected to the locking means to rotate together. The torsion bar also includes a second torque transmitting portion which is fitted to the reel so that the second torque transmitting portion is connected to the reel to rotate together. The torsion bar further includes a torsion portion which is fixed between the first and second torque transmitting portions and is designed to be twisted to absorb the load exerted on the webbing. One end in the axial direction of one of the first and second torque transmitting portions is axially in contact with the corresponding one of the locking means. The reel and the other end of the one of the torque transmitting portions is axially in contact with a holder member fitted in the corresponding one of the locking means and the reel. One end in the axial direction of the other one of the first and second torque transmitting portions is in axially in contact with the other corresponding one of the locking means. The reel and the other end of the other one of the torque transmitting portions is axially in contact with a crimped portion of the other corresponding one of the locking means and the reel.

Furthermore, the holder member may be composed of a pin having a slope(s) where it comes in contact with the torque transmitting portion.

Furthermore, the holder member may further includes a slit(s) formed in the portion where comes in contact with the torque transmitting portion so as to elastically press the torque transmitting portion in the axial direction.

Furthermore, the holder member may be composed of a plate to elastically press the torque transmitting portion in the axial direction.

In addition, the holder member may be composed of a pin having a first engaging protrusion at one end thereof and a first engaging protrusion at the other end thereof. A member into which the holder member is fitted is formed with a holder-member-fitting hole having two stepped portions. The first engaging protrusion is engaged with one of the stepped portions and the second engaging protrusion is engaged with the other one of the stepped portions when the holder member is inserted into the holder-member-fitting hole. As a result, the torque transmitting portion is brought in contact with a middle portion of the pin.

Moreover, at least one of the first and second torque transmitting portions may be formed in serration, to have a TORX-wrench-like section, or to have a hexagonal section.

At least one of the first and second torque transmitting portions may be clamped between one of the locking means and the reel, into which the at least one of torque transmitting portions is fitted, and the holder member in the axial direction. Alternatively, at least one of the first and second torque transmitting portions is fixed by crimping one of the locking means and the reel into which the at least one of torque transmitting portions is fitted. Alternatively, one of the first and second torque transmitting portions may be clamped between one of the locking means and the reel, into which the at least one of torque transmitting portions is fitted, and the holder member in the axial direction. The other one of the first and second torque transmitting portions may be fixed by crimping one of the locking means and the reel into which the at least one of torque transmitting portions is fitted.

Accordingly, at least one of the first and second torque transmitting portions conventionally formed in the torsion bar is effectively used. Therefore, a groove into which an E-ring conventionally used for the torsion bar can be eliminated, thereby simplifying the configuration of the torsion bar and simplifying the working for the torsion bar.

At least one of the first and second torque transmitting portions may be strictly fixed without backlash in the axial direction. Therefore, the occurrence of jarring noise due to vibrations or the like of the seat belt retractor can be prevented. The torque transmission can be further secured.

As apparent from the above description, at least one of first and second torque transmitting portions conventionally formed in a torsion bar is effectively used to fix the torsion bar in the axial direction. An E-ring as conventionally used for the torsion bar can be eliminated, thereby simplifying the configuration of the torsion bar. Therefore, the working for assembling the torsion bar is also simplified and the manufacturing cost of the torsion bar can be reduced.

It is to be understood that both the foregoing general description and the following detailed description are exemplary and explanatory only, and are not restrictive of the invention as claimed.

BRIEF DESCRIPTION OF THE DRAWINGS

These and other features, as aspects, and advantages of the present invention will become apparent from the following description, appended claims, and the accompanying exemplary embodiments shown in the drawings, which are briefly described below.

FIGS. 3(a)–3(g) are perspective views showing various examples of a holder member used in the seat belt retractor shown in FIG. 1.

FIGS. 7(a), 7(b) are sectional view showing the structures for fixing the second torque transmitting portion of the torsion bar shown in FIG. 6, wherein FIG. 7(a) is a sectional view taken along a line VII—VII of FIG. 6 showing the fixing structure by the holder member shown in FIG. 3(a) and FIG. 7(b) is a sectional view taken along a line VII—VII of FIG. 6 showing the fixing structure by the holder member shown in FIG. 3(g).

DETAILED DESCRIPTION

Although references are made below to directions, such as left, right, up, down, etc., in describing the drawings, they are made relative to the drawings (as normally viewed) for convenience. These directions are not intended to be taken literally or limit the present invention in any form.

Hereinafter, the present invention will be described with reference to the attached drawings.

Figure 1:
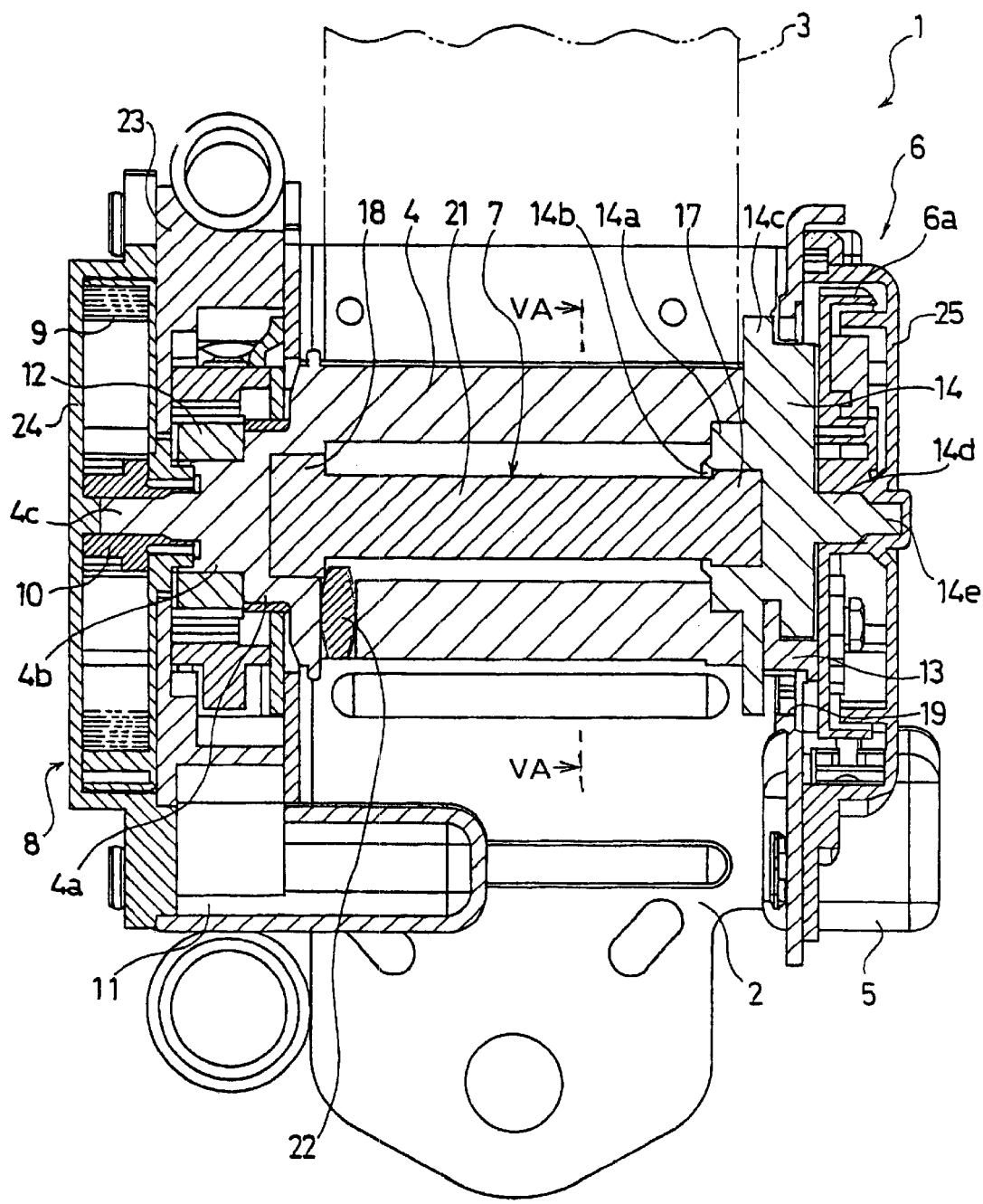
FIG. 1 is a sectional view showing an embodiment of the seat belt retractor according to the present invention.
Figure 8:
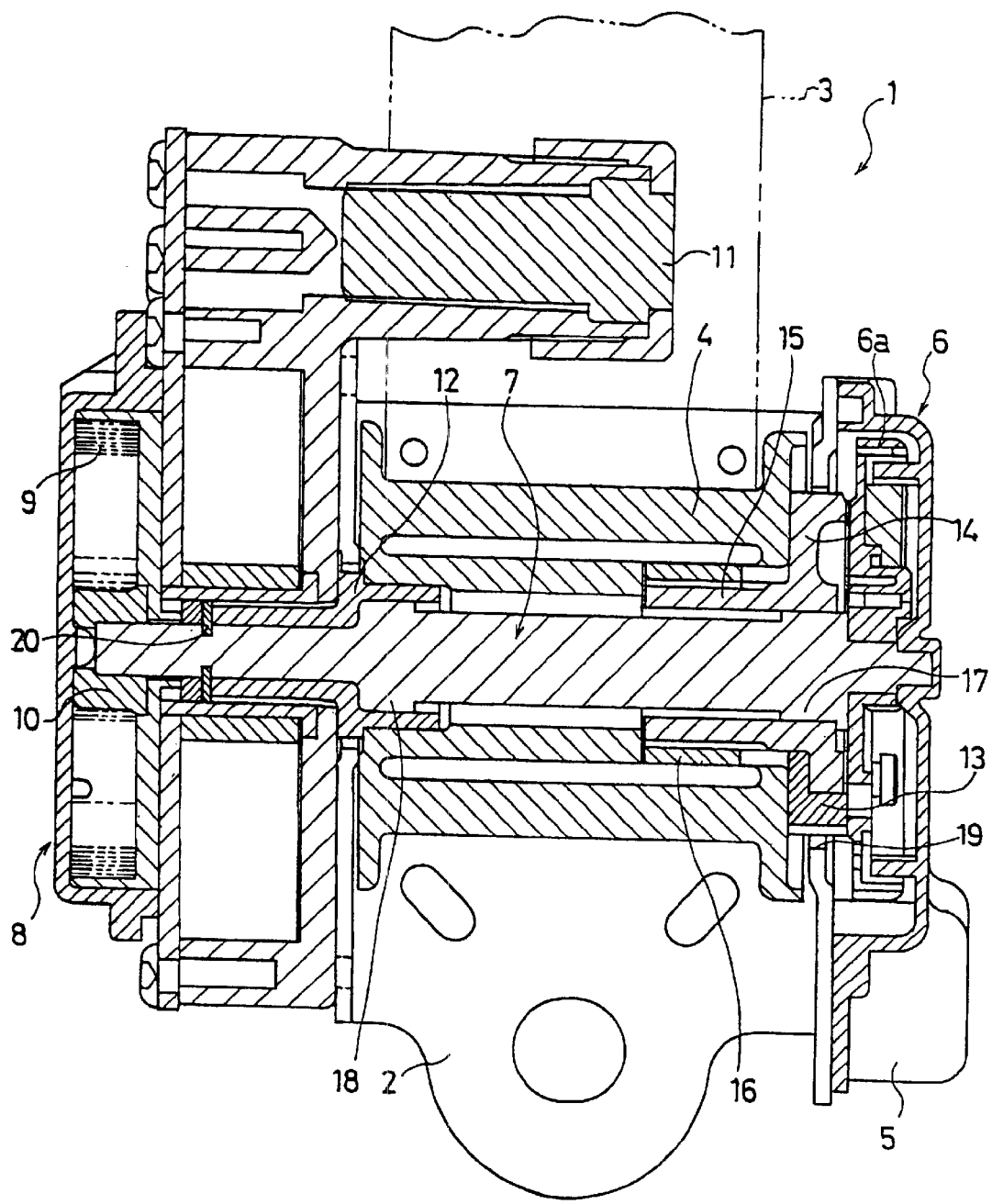
FIG. 8 is a vertical sectional view showing an example of a seat belt retractor with a conventional torsion bar.

FIG. 1 is a sectional view, similar to FIG. 8, showing an embodiment of the seat belt retractor according to the present invention. Parts of the following embodiment similar or corresponding to the parts of the conventional seat belt retractor shown in FIG. 8 will be marked by the same reference numerals and a detailed description of the parts will be omitted.

As shown in FIG. 1, in the seat belt retractor 1, a reel 4 is provided, at a spring means 8 side, with a stepped extension shaft which is formed coaxially with a webbing winding portion thereof. The stepped extension shaft of the reel 4 comprises a first extension shaft 4a rotatably supported by a frame 2, a second extension shaft 4b having a diameter smaller than that of the first extension shaft 4a, and a third extension shaft 4c having a diameter smaller than that of the second extension shaft 4b.

The first extension shaft 4a is rotatably supported by the frame 2 while the third extension shaft 4c is fitted in a brush 10 of the spring means 8 in such a manner that the third extension shaft 4c can rotate together with the bush 10. The second extension shaft 4b penetrates a bush 12, for transmitting webbing winding torque of the pretensioner 11 to the reel 4, whereby the second extension shaft 4b and the bush 12 rotate together.

Figure 2:
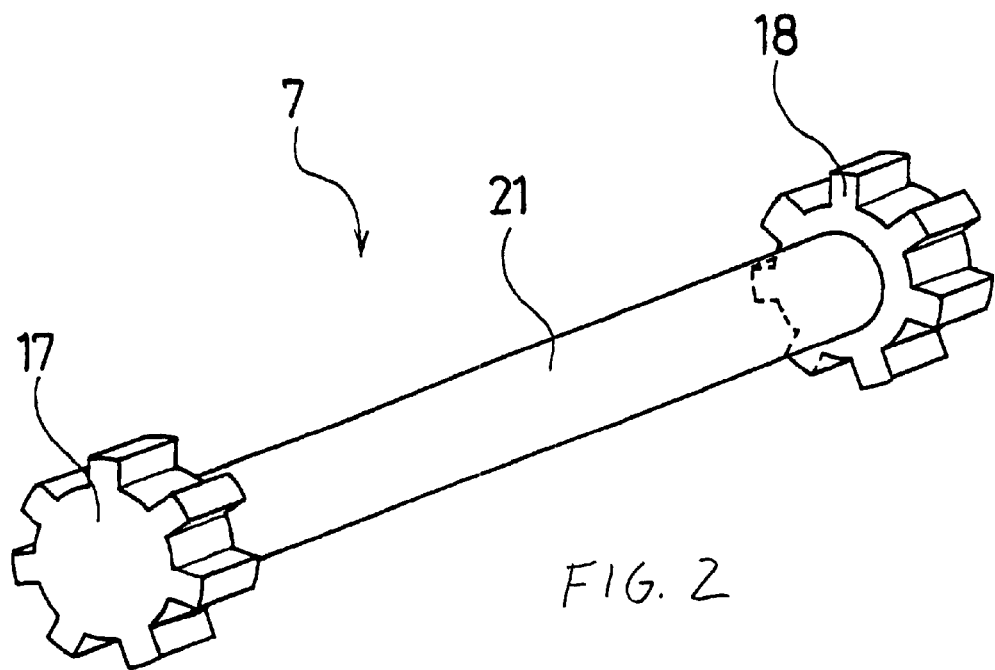
FIG. 2 is a perspective view showing an example of first and second torque transmitting portions of a torsion bar used in the seat belt retractor shown in FIG. 1.

The torsion bar 7 comprises first and second torque transmitting portions 17, 18, and a torsion portion 21 which is disposed between the first and second torque transmitting portions 17 and 18 to absorb impact energy when twisted. As shown in FIG. 2, the first and second torque transmitting portions 17, 18 are both formed in flange-shaped serration.

The torsion bar 7 is inserted into the reel 4 from the right in FIG. 1 until the second torque transmitting portion 18 is fitted in an axial hole of the reel 4 so that the torsion bar 7 is connected to the reel 4 in such a manner as to rotate together with the reel 4. Press-fitting ribs (not shown) are formed on the inner surface of the axial hole of the reel 4 into which the second torque transmitting portion 18 is inserted. By the press-fitting ribs, the second torque transmitting portion 18 is press-fitted into the axial hole of the reel 4 and the backlash is eliminated between the second torque transmitting portion 18 and the reel 4, thereby preventing the occurrence of jarring noise. Then, the left end of the second torque transmitting portion 18 comes in contact with the reel 4, thereby defining the left position of the torsion bar 7 relative to the reel 4 in the axial direction. The right end of the second torque transmitting portion 18 comes in contact with an end of a linear pin-like holder member 22 radially press-fitted in a holder-member-fitting hole of the reel 4, thereby defining the right position of the torsion bar 7 relative to the reel 4. Therefore, the second torque transmitting portion 18 is prevented from coming off the axial hole of the reel 4.

As shown in FIG. 3(*a*), the holder member 22 is preferably made of resin or metal such as soft iron or aluminum and is formed to have a rectangular section. The holder member 22 comprises end portions 22*a*, 22*b* being tapered toward the tips thereof, i.e. having slopes, and a body portion 22*c* between the end portions 22*a* and 22*b*, the body portion 22*c* being formed to have a constant sectional area. The holder member 22 is structured such that the left end of the body portion 22*c* is slightly overlapped with the right end of the second torque transmitting portion 18 in the axial direction when assembled. Therefore, a slope of the end portion 22*a* comes in contact with the right end of the second torque transmitting portion 18 when the holder member 22 is press-fitted, whereby the second torque transmitting portion 18 is pressed in the axial direction to the left. In this manner, the second torque transmitting portion 18 is strictly fixed between the reel 4 and the holder member 22 without backlash in the axial direction.

The first torque transmitting portion 17 is fitted in a pawl holder 14 in such a manner that the torsion bar 7 can rotate together with the pawl holder 14. Press-fitting ribs (not shown) are formed on the inner surface of an axial hole of the pawl holder 14 into which the first torque transmitting portion 17 is inserted. By the press-fitting ribs, the first torque transmitting portion 17 is press-fitted into the axial hole of the pawl holder 14 and the backlash is eliminated between the first torque transmitting portion 17 and the pawl holder 14, thereby preventing the occurrence of jarring noise. While the right end of the first torque transmitting portion 17 comes in contact with the pawl holder 14, an internal periphery 14*b* of a left end portion 14*a* of the pawl holder 14 is crimped to the left end of the first torque transmitting portion 17, as shown in FIG. 5(*b*). As a result, the first torque transmitting portion 17 is strictly fixed to the pawl holder 14 without backlash in the axial direction. Therefore, the first torque transmitting portion 17 is prevented from coming off the axial hole of the pawl holder 14.

In addition, the left end portion 14*a* of the pawl holder 14 is fitted in the reel 4 without backlash in the radial direction in such a manner that the pawl holder 14 can rotate relative to the reel 4 for a predetermined angle, and the left end portion 14*a* is in contact with the right end of the reel 4. At this point, the torsion bar 7 and the pawl holder 14 are arranged coaxially with the reel 4.

The pawl holder 14 has a flange 14*c* for guiding the webbing 3 when the reel 4 winds up the webbing 3 and a stepped extension shaft formed coaxially with the webbing winding portion of the reel 4. The stepped extension shaft of the pawl holder 14 comprises a first extension shaft 14*d* for rotatably supporting a lock gear 6*a* of a locking mechanism 6 and a second extension shaft 14*e* rotatably supported by a cover 25 of the locking mechanism 6 and having a diameter smaller than that of the first extension shaft 14*d*.

The left end of the third extension shaft 4*c* of the reel 4 is in contact with a cover 24 of the spring means 8 which is fixed to the frame 2 through a housing 23 of a pretensioner 11, thereby defining the left position of the reel 4 and the torsion bar 7 in the axial direction relative to the frame 2. The right end of the second extension shaft 14*e* of the pawl holder 14 is in contact with the cover 25 of the locking mechanism 6 fixed to the frame 2, thereby defining the right position of the reel 4 and the torsion bar 7 in the axial direction relative to the frame 2.

In the seat belt retractor 1 of the present invention, the external thread portion 15 formed in the pawl holder 14 and the stopper member 16 into which the external thread portion 15 is screwed in the aforementioned conventional seat belt retractor 1 are not employed. In the EA (Energy Absorbing) mechanism of this embodiment, the aforementioned EA stroke is freely set by adjusting the composition of material of the torsion bar 7.

The other structures and actions of the seat belt retractor 1 of this embodiment are the same as those of the conventional one as described with reference to FIG. 8.

According to the seat belt retractor 1 of the present invention, the second torque transmitting portion 18 is strictly fixed by the reel 4 and the holder member 22 without backlash in the axial direction. Therefore, the second torque transmitting portion 18 conventionally used in the torsion bar 7 is effectively used without forming a groove in the torsion bar 7 into which the E-ring is fitted, thereby simplifying the configuration of the torsion bar 7. In addition, the torsion bar 7 is set without penetrating the reel 4, thereby shortening the axial length of the torsion bar 7 and thus further simplifying the configuration of the torsion bar 7. Therefore, the working for the torsion bar 7 is also simplified and the weight of the torsion bar 7 can be reduced.

Since the second torque transmitting portion 18 is fixed without backlash in the axial direction, the occurrence of jarring noise due to vibrations or the like of the seat belt retractor can be prevented.

The first torque transmitting portion 17 can also be strictly fixed without backlash by crimping the pawl holder 14. Therefore, the first torque transmitting portion 17 conventionally used in the torsion bar 7 is effectively used, thereby further simplifying the torsion bar 7. In addition, the torsion bar 7 is set without penetrating the pawl holder 14, thereby further shortening the axial length of the torsion bar 7 and thus furthermore simplifying the configuration of the torsion bar 7. Therefore, the working for the torsion bar 7 can be further simplified and the weight of the torsion bar 7 can be further reduced.

Though both the first and second torque transmitting portions 17, 18 of the torsion bar 7 are strictly fixed without backlash in the axial direction in the aforementioned embodiment, only one of the first and second torque transmitting portions 17, 18 may be strictly fixed without backlash in the axial direction. The first torque transmitting portion 17 may be fixed by the pin-like holder member 22 press-fitted radially in at least one of the reel 4 and the pawl holder 14 and, alternatively, the first torque transmitting portion 17 may be fixed to the bush 12 in the axial direction by crimping the bush 12 for transmitting the webbing winding torque of the pretensioner 11 to the reel 4. In this case, the right end portion of the bush 12 is formed symmetrically to the left end portion 14a of the pawl holder 14 having the crimped portion 14b as shown in FIG. 1, so that the bush 12 can be fitted rotatably together with the reel 4.

The holder member 22 may be formed to have a circular section as shown in FIG. 3(b) or to have other-shaped section. Further, instead of the linear pin-like configuration, the holder member 22 may be formed in a U-shaped configuration as shown in FIG. 3(c). Furthermore, the holder member 22 may be formed in a L-shaped plate-like configuration, U-shaped plate-like configuration as shown in FIGS. 3(d) and 3(e), respectively, or a simple rectangular plate-like configuration (not shown). Moreover, as shown in FIG. 3(f), the pin-like holder member 22 may be formed with slits 22d in the end portion 22a and the body portion 22c to have large elasticity at the end portion 22a and the body portion 22c. In this case, when the slope of the end portion 22a comes in contact with the second torque transmitting portion 18, the elastic force of the end portion 22a and the body portion 22c can press the second torque transmitting portion 18 to the left in the axial direction. Because the second torque transmitting portion 18 is pressed by the elastic force, the holder member 22 is flexibly overlapped with the right end of the second torque transmitting portion 18 in the axial direction.

Figures 4A, 4B:
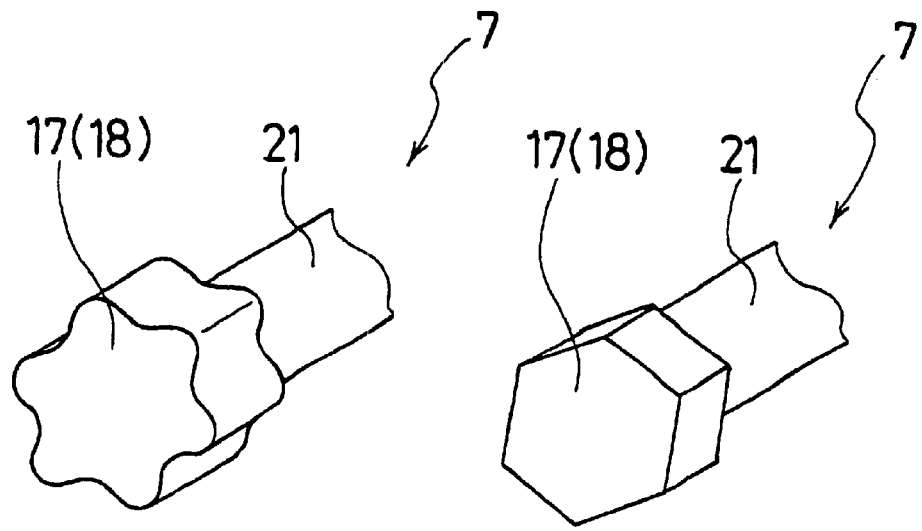
FIGS. 4(a), 4(b) are perspective views showing other examples of the first and second torque transmitting portions of the torsion bar used in the seat belt retractor shown in FIG. 1.

Instead of the serration, the first and second torque transmitting portions 17, 18 may be formed in a TORX®-wrench-like configuration or a hexagonal configuration as shown in FIGS. 4(a), 4(b), respectively. TORX® is a trademark of Textron Inc. In brief, the first and second torque transmitting portions 17, 18 may be formed in any flange-shaped configuration as to achieve the torque transmission to the reel 4 and the pawl holder 14. In particular, when the first and second torque transmitting portions 17, 18 are each formed in serration, a TORX®-wrench-like configuration, or a hexagonal configuration, the torque transmission can be further secured.

Figure 5B:
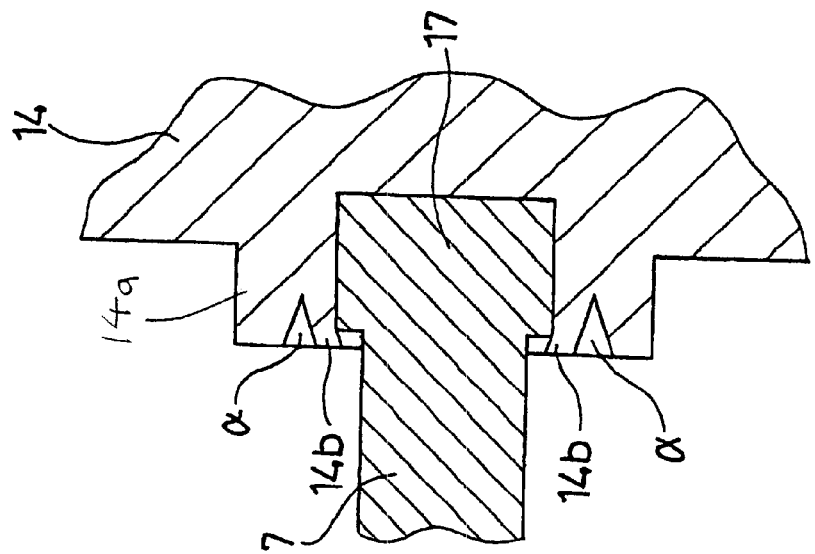
FIGS. 5(a), 5(b) are sectional views taken along a line VA—VA in FIG. 1, showing a variation of the structure of fixing the first torque transmitting portion of the torsion bar shown in FIG. 1.
Figure 5A:
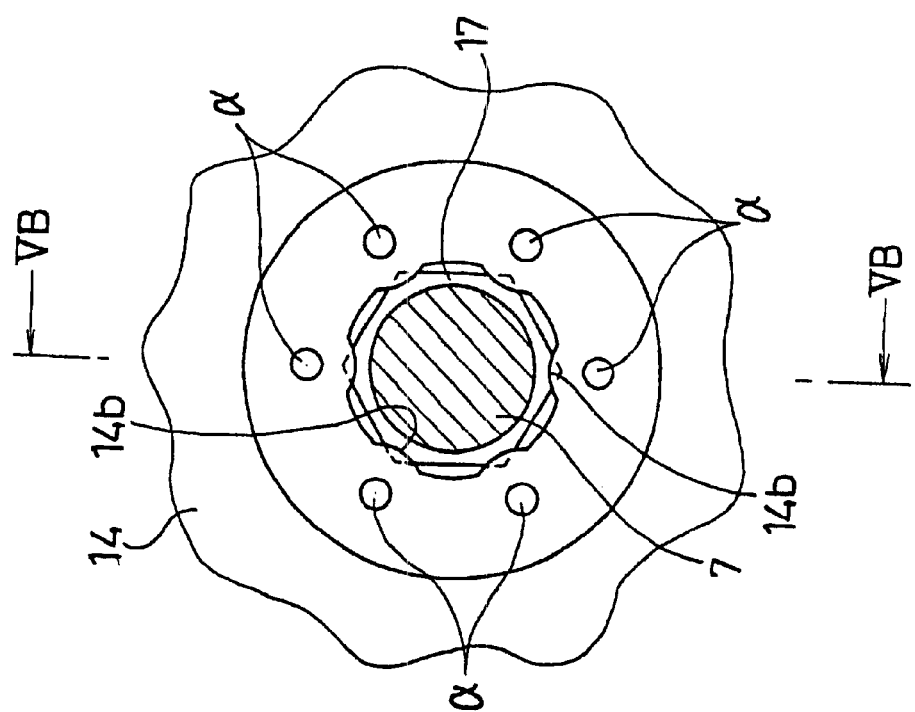

Instead of the crimping of the internal periphery 14b of the pawl holder 14, the strict fixturing of the first torque transmitting portion 17 may be accomplished by inwardly projected portions of the internal periphery 14b of the pawl holder 14, these portions being formed by punching several spots (six spots in the shown example) to make punched holes α along the circumferential direction as shown in FIGS. 5(a) and 5(b). By this structure, the first torque transmitting portion 17 can be more easily fixed to the pawl holder 14.

Figure 6:
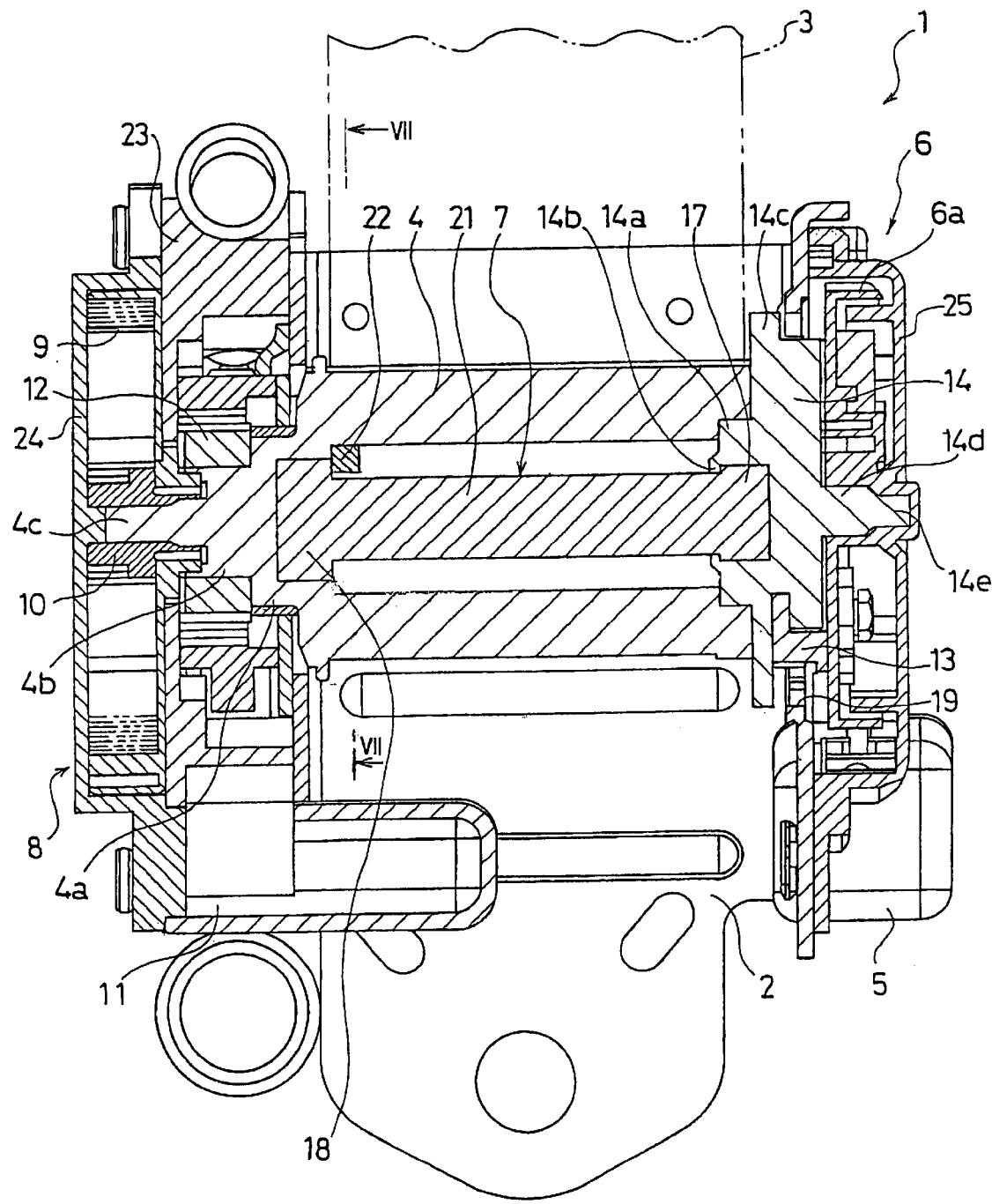
FIG. 6 is a sectional view similar to FIG. 1 but showing another embodiment of the present invention.

FIG. 6 is a sectional view similar to FIG. 1 but showing another embodiment of the present invention.

Figure 7A:
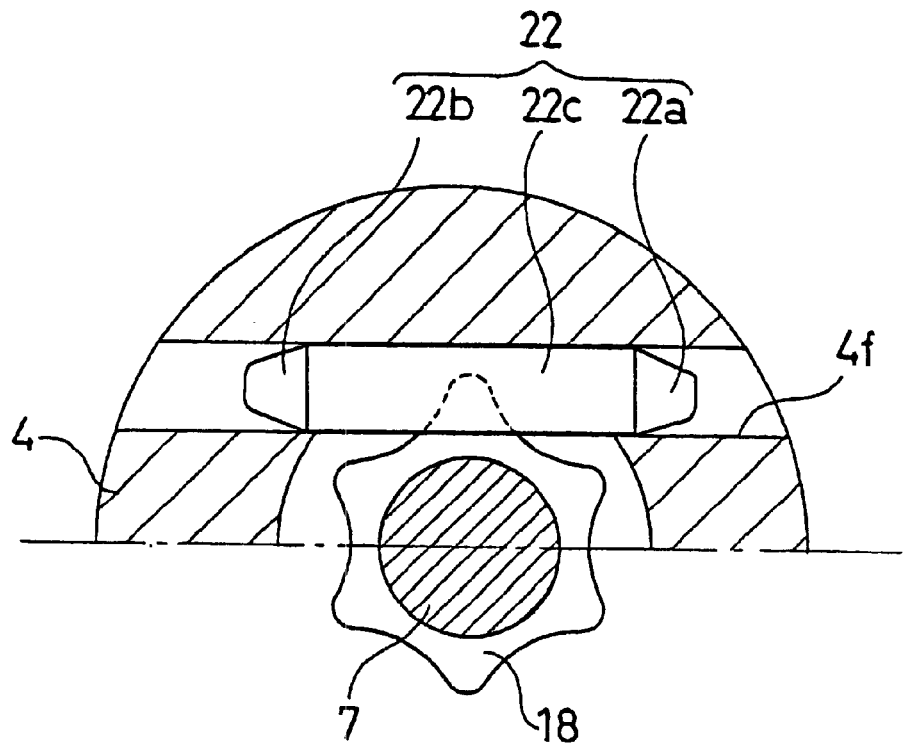

In the seat belt retractor 1 of the aforementioned embodiment, the holder member 22 is press-fitted in the reel 4 in a radial direction toward the axis of the reel 4 and the slope of the end portion 22a thus comes in contact with the right end of the second torque transmitting portion 18, whereby the second torque transmitting portion 18 is fixed to the reel 4. In a seat belt retractor 1 of this embodiment, however, a holder member 22 is press-fitted in a holder-member-fitting hole 4f formed in a reel 4 in such a direction as not to pass the axis of the reel 4 and a middle portion 22c of the holder member 22 thus comes in contact with the right end of a second torque transmitting portion 18 as shown in FIG. 6 and FIG. 7(a), whereby the second torque transmitting portion 18 is fixed to the reel 4 more strictly as compared to the aforementioned embodiment, not to allow the relative rotation. In the state that the holder member 22 is fitted in the holder-member-fitting hole 4f, the holder member 22 is held in the reel 4 by friction produced by press-fitting, thereby preventing the holder member 22 from coming off the holder-member-fitting hole 4f.

The holder member 22 employed in the seat belt retractor 1 of this embodiment may be any one of the holder member 22 shown in FIGS. 3(a) through 3(f) just like the aforementioned embodiment. Instead of these holder members 22, a holder member 22 shown in FIG. 3(g) may also be employed in the embodiment of FIG. 6. The holder member 22 has a head 22e (corresponding to the first engaging protrusion of the present invention) formed at an end portion 22b, and a slit 22d formed to extend through the other end portion 22a and a portion of a body portion 22c so that the end portion 22a and the portion of the body portion 22c are divided into two, whereby the end portion 22a and the portion of the body portion 22c have large elasticity. Two divided end portions 22a have slopes, just like the other examples, and hook protrusions 22f (corresponding to the second engaging protrusion), respectively. The portion of the body portion 22c is formed to be tapered in a predetermined range 22g including the divided portions.

Figure 7B:
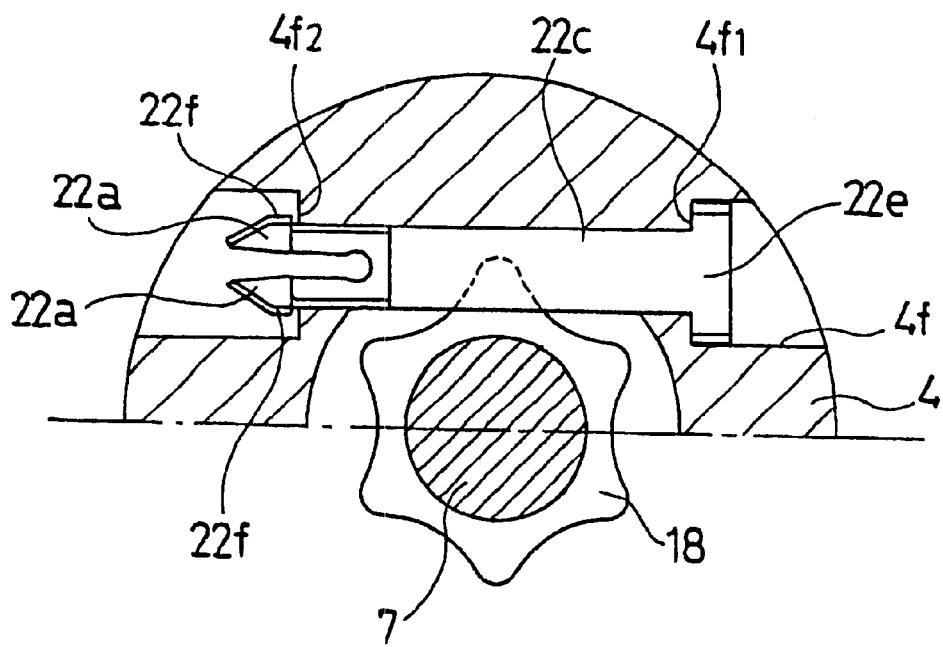

In this case, the reel 4 is formed with a holder-member-fitting hole 4f, like the example shown in FIG. 7(a), which is formed in such a manner that the diameter at both open ends is larger than the diameter at a middle portion of the holder-member-fitting hole 4f as shown in FIG. 7(b) so as to have two stepped portions $4f_1$, $4f_2$. The both open ends of the holder-member-fitting hole 4f are designed to allow both of the head 22e and a pair of the hook protrusions 22f to enter therein. The middle portion of the holder-member-fitting hole 4f allows the body portion of the holder member 22 to be press-fitted therein and does not allow the head 22e of the holder member 22 to be inserted therein. Further, the middle portion of the holder-member-fitting hole 4f does not allow the insertion of the pair of hook protrusions 22f, but allow the insertion of the pair of hook protrusions 22f in the state that the end portions 22a and the divided portions of the body portion 22c of the holder member 22 are elastically deformed in a direction getting closer to each other.

To fix the second torque transmitting portion 18 of the torsion bar 7 to the reel 4 by using the holder member 22, the holder member 22 is inserted into the holder-member-fitting hole 4f of this example in the state that the second torque transmitting portion 18 is fitted in the hole of the reel 4. In this case, the holder member 22 is inserted into the holder-member-fitting hole 4f from the end portions 22a thereof through the right-side open end of the holder-member-fitting hole 4f in FIG. 7(b). Then, the slopes of the end portions 22a come in contact with the stepped portion $4f_1$. As the holder member 22 is further inserted from this state, the slopes of the end portions 22a are subjected to pressure from the reel 4 so that the end portions 22a and the divided portions of the body portion 22c are elastically deformed in the direction getting closer to each other, while the hook protrusions 22f enter into the middle portion of the holder-member-fitting hole 4f. As the hook protrusions 22f enter into the middle portion of the holder-member-fitting hole 4f, the hook protrusions 22f is subjected to pressure from the reel 4. The holder member 22 is press fitted in the holder-member-fitting hole 4f.

As the holder member 22 is further inserted into the holder-member-fitting hole 4f, the left side surface of the body portion of the holder member 22 comes in contact with the right surface of the second torque transmitting portion 18 in FIG. 6. At this point, the holder member 22 is smoothly inserted with being guided by the tapered surface formed in the body portion and the left side surface of the body portion of the holder member 22 comes in contact with the right surface of the second torque transmitting portion 18.

After the hook protrusions 22f of the holder member 22 completely pass the stepped portion $4f_2$ of the holder-member-fitting hole 4f, the hood protrusions 22f are no longer subjected to pressure from the reel so that the end portions 22a and the divided portions of the body portion 22c return to their original state by their elastic restoring forces. In this state, the head 22e of the holder member 22 is stopped by the stepped portion $4f_1$ and the hook projections 22f are engaged with the stepped portion $4f_2$ as shown in FIG. 7(b), whereby the holder member 22 is held in the reel 4 and is prevented from coming off the holder-member-fitting hole 4f. It should be noted that also the friction produced by press-fitting of the holder member 22 is useful in holding the holder member 22 in the reel 4 and in preventing the holder member 22 from coming off the holder-member-fitting hole 4f.

By the structure that the left side surface of the middle portion of the holder member 22 is in contact with the right surface of the second torque transmitting portion 18, the second torque transmitting portion 18 is fixed to the reel 4 further strictly as compared to the other examples without backlash and is prevented from coming off the axial hole of the pawl holder 14, thereby preventing the occurrence of jarring noise.

The other structure and the other actions and effects are the same as those of the aforementioned embodiment.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The entire disclosure of the priority documents Japanese Patent Application Nos. H11-348622 and 2000-365599 are incorporated by reference herein.

What is claimed is:

1. A seat belt retractor comprising:
   a reel for winding up a webbing;
   a locking mechanism configured to prevent the rotation of the reel in a webbing unwinding direction when actuated;
   a deceleration sensor configured to detect a predetermined deceleration to actuate said locking mechanism; and
   a torsion bar rotationally connecting said reel and said locking mechanism and having a portion disposed within said reel coaxially with said reel, said torsion bar absorbing load exerted on the webbing when said locking mechanism is actuated, wherein said torsion bar comprises
      a flange-like first torque transmitting portion which is connected to said locking mechanism to rotate together,
      a second torque transmitting portion which is fitted into an opening in said reel to rotate together, and
      a torsion portion which is fixed between said first and second torque transmitting portions and is configured to twist to thereby absorb the load exerted on the webbing,
      wherein the second torque transmitting portion is prevented from moving out of the opening in said reel toward the locking mechanism by a holder member that is fitted in and extends out of said reel.

2. The seat belt retractor of claim 1, wherein said holder member comprises a pin having a sloped surface in contact with said second torque transmitting portion.

3. The seat belt retractor of claim 2, wherein said holder member further includes a slit that permits the holder member to deform to elastically press said second torque transmitting portion toward the opening in the reel.

4. The seat belt retractor of claim 2, wherein said holder member comprises a u-shaped pin, whereby said second torque transmitting portion contacts a middle portion of said u-shaped pin.

5. The seat belt retractor of claim 1, wherein said holder member comprises a plate to elastically press said one of said torque transmitting portions in the axial direction.

6. A seat belt retractor comprising:
   a reel for winding up a webbing;
   a locking mechanism configured to prevent the rotation of the reel in a webbing unwinding direction when actuated;
   a deceleration sensor configured to detect a predetermined deceleration to actuate said locking mechanism; and
   a torsion bar rotationally connecting said reel and said locking mechanism and having a portion disposed within said reel coaxially with said reel, said torsion bar absorbing load exerted on the webbing when said locking mechanism is actuated, wherein said torsion bar comprises
      a flange-like first torque transmitting portion which is fitted to said locking mechanism to rotate together,
      a second torque transmitting portion which is fitted to said reel to rotate together, and
      a torsion portion which is fixed between said first and second torque transmitting portions and is configured to twist to thereby absorb the load exerted on the webbing,
      wherein the locking mechanism includes a crimped portion sealed against the first torque transmitting portion to thereby prevent motion of the first torque transmitting portion away from the locking mechanism in a direction toward the second torque transmitting portion.

7. A seat belt retractor comprising:
   a reel for winding up a webbing;
   a locking mechanism configured to prevent the rotation of the reel in a webbing unwinding direction when actuated;
   a deceleration sensor configured to detect a predetermined deceleration to actuate said locking mechanism; and
   a torsion bar rotationally connecting said reel and said locking mechanism and at least having a portion disposed within said reel coaxially with said reel, said torsion bar absorbing load exerted on said webbing when said locking mechanism is actuated, wherein said torsion bar comprises
      a flange-like first torque transmitting portion which is fitted to said locking mechanism so that said first torque transmitting portion is connected to said locking mechanism to rotate together,
      a second torque transmitting portion which is fitted to said reel so that said second torque transmitting portion is connected to said reel to rotate together, and
      a torsion portion which is fixed between said first and second torque transmitting portions and is designed to be twisted to absorb the load exerted on said webbing, wherein one end in an axial direction of at least one of said first and second torque transmitting portions is axially in contact with the corresponding one of said locking mechanism and said reel and an opposite end of said at least one of said torque transmitting portions is axially in contact with a holder member fitted in said corresponding one of said locking mechanism and said reel;

wherein said holder member is composed of a plate to elastically press said one of said torque transmitting portions in the axial direction.

8. A seat belt retractor comprising:

a reel for winding up a webbing;

a locking mechanism configured to prevent the rotation of the reel in a webbing unwinding direction when actuated;

a deceleration sensor configured to detect a predetermined deceleration to actuate said locking mechanism; and a torsion bar rotationally connecting said reel and said locking mechanism and at least having a portion disposed within said reel coaxially with said reel, said torsion bar absorbing load exerted on said webbing when said locking mechanism is actuated, wherein said torsion bar comprises a flange-like first torque transmitting portion which is fitted to said locking mechanism so that said first torque transmitting portion is connected to said locking mechanism to rotate together, a second torque transmitting portion which is fitted to said reel so that said second torque transmitting portion is connected to said reel to rotate together, and a torsion portion which is fixed between said first and second torque transmitting portions and is designed to be twisted to absorb the load exerted on said webbing, wherein one end in an axial direction of at least one of said first and second torque transmitting portions is axially in contact with the corresponding one of said locking mechanism and said reel and an opposite end of said at least one of said torque transmitting portions is axially in contact with a holder member fitted in said corresponding one of said locking mechanism and said reel;

wherein said holder member is composed of a pin having a slope where the pin comes in contact with said one of said torque transmitting portions, wherein the pin has a first engaging protrusion at one end thereof and a second engaging protrusion at an opposite end thereof, wherein a member into which said holder member is fitted is formed with a holder-member-fitting hole having two stepped portions, wherein said first engaging protrusion is engaged with one of said stepped portions and said second engaging protrusion is engaged with the other one of said stepped portions when said holder member is inserted into said holder-member-fitting hole, whereby said one of said torque transmitting portions is brought in contact with a middle portion of said pin.

9. A seat belt retractor having a torsion bar for absorbing load placed on a webbing by a vehicle passenger, wherein the torsion bar includes first and second enlarged sections for transmitting torque, wherein the second enlarged section is press fitted into an opening in a wind-up reel for the webbing and the first enlarged section is press fitted into an opening in a pawl holder of a locking mechanism; wherein the pawl holder is crimped and sealed around the first enlarged section to thereby prevent movement of the first enlarged section out of the opening in the pawl holder in a direction toward the second enlarged section.

10. The retractor of claim 9, further comprising a pin shaped holder member fitted into the reel and in contact with the second enlarged section to thereby prevent movement of second enlarged section away from the opening in the reel in a direction toward the first enlarged section.

* * * * *